United States Patent Office 3,536,663
Patented Oct. 27, 1970

3,536,663
STABILIZED POLYURETHANES
Harald Oertel, Odenthal-Globusch, and Friedrich-Karl Rosendahl and Heinrich Rinke, Leverkusen, Germany, assignors to Farbenfabriken Bayer Aktiengesellschaft, Leverkusen, Germany, a corporation of Germany
No Drawing. Filed Dec. 5, 1967, Ser. No. 687,970
Claims priority, application Germany, Dec. 5, 1966, F 50,852
Int. Cl. C08g 22/04
U.S. Cl. 260—47          16 Claims

ABSTRACT OF THE DISCLOSURE

Stabilizing polyurethanes containing structural segments consisting of an alkylphenol grouping having at least one tertiary alkyl group in the ortho position to the hydroxyl group and preparing said stabilized polyurethanes by reacting a polyisocyanate with a phenol containing at least one tertiary alkyl group in the ortho position to the phenolic hydroxyl group and one aliphatic radical having two groups being reactive with NCO groups, the amount of the phenolic structural segment in the elastomeric polyurethane being in the range of 0.1 to about 10% by weight based on the polyurethane.

This invention relates to stabilized polyurethanes and, more particularly, to a process for preparing stabilized elastomeric polyurethanes of segmented linear or cross-linked structure in the form of fibers, foils, elastomers or cellular foams against degradation, and the stabilized polyurethanes thereby obtained.

Synthetic resins containing urethane groups can be produced in various ways such as, for example, by the polyisocyanate polyaddition process in which polyhydroxy compounds, usually of comparatively high molecular weights, are reacted with polyisocyanates and, if desired, chain lengthening agents containing active hydrogen atoms, such as, for example, water, polyols, polyamines, hydrazine, carbohydrazide, polycarboxylic acid hydrazides, polysemicarbazides and polycarbazic acid esters. Such polyurethanes have found a wide range of uses as fibers, foils, coatings, lacquers, foam plastics and elastomers because of their high tensile strength, abrasion resistance, resistance to hydrolysis and, in some cases, high elasticity.

However, in many cases polyurethanes are unstable when exposed to fumes and atmospheric impurities, especially traces of nitrogen oxides, and the action of light (sunlight or artificial ultraviolet radiation), especially in the presence of oxygen, and they tend to degrade and discolor as a consequence. This is particularly true for those polyurethanes which have a relatively large surface area, such as fibers, foils, coatings, foams, and the like. Notwithstanding, the sensitivity of polyurethane resins to oxidation and other degrading influences varies according to their structural components.

Numerous auxiliary agents have been proposed as inhibitors for the aging and attendant deterioration in the properties of polyurethanes in air or oxygen, with or without the simultaneous action of sunlight or artificial light. Such auxiliary agents include various phenolic antioxidants or ultraviolet absorbents such as, for example, phenothiazine, phenyl - b - naphthylamine, dinaphthyl-p-phenylene diamine, 2-mercaptoimidazoline, and a large number of substituted phenols; particularly derivatives of o,o′-dihydroxybenzophenone or -diphenylmethane and mixtures of phenolic antioxidants and ultraviolet absorbers.

The use of combinations of 2,2′-dihydroxybenzophenones as ultraviolet absorbents and certain phenolic compounds as anti-oxidants is already known. However, elastomeric filaments which have been stabilized with o,o′-dihydroxybenzophenone derivatives or with 2-(2′-hydroxy-3′-tertiary-butyl-5′-methyl-phenyl) - 5 - chloro - benzotriazole show very unpleasant intensive yellow discoloring when subjected to the action of basic compounds, especially in the presence of solvents which have a swelling action on the polyurethane. In some cases, the foregoing phenomenon is even accompanied by extensive extraction of the said compounds.

The use of 2,6-di-tertiary-butyl-phenol derivatives for stabilizing synthetic resins is also known. For example, the use of 2,6-di-tertiary-butyl-4-(methyl)-phenol, esters or amides of 2,6-di-tertiary-butyl-phenyl-propionic acid with monohydric or polyhydric alcohols such as methanol, stearyl alcohol or pentaerythritol or primary or secondary aliphatic amines is known. Furthermore, 1,3,5-trimethyl - 2,4,6-tri-(3,5-ditertiary-butyl-4-hydroxybenzyl)-benzene has been suggested for use as an anti-oxidant for polyurethanes.

However, such compounds as 2,6-di-tertiary-butylphenol or 3,3′,5,5′-tetra-tertiary - butyl - 4,4′ - dihydroxy-diphenylmethane, for example are practically ineffective as stabilizers for polyurethanes because they are too volatile or lead to the discoloration of elastomeric polyurethane substances. Other compounds which have been found to be effective as anti-oxidants to a certain extent if added to polyurethanes in sufficient quantities nevertheless suffer the serious disadvantage that although they are compatible with the polyurethanes when added thereto, they dissolve out of the polyurethanes, especially in washing processes, dry cleaning or as a result of weathering. As a consequence, the original protective action of such stabilizers is lost.

Highly elastic polyurethane elastomer filaments, which may be produced as very fine filaments, have proven particularly difficult to stabilize against discoloration and degradation under the influence of light, heat and oxygen. This is especially true since the stabilizers used for highly elastic polyurethane filaments dissolve comparatively rapidly from their surface on washing, especially at elevated temperatures, and in boiling or dyeing processes, for example, because of the large surface area exposed. Attempts have been made to counteract the tendency of stabilizers to dissolve out by increasing their molecular weights. However, the extent to which the molecular weights of these compounds may be increased is limited. For example, the highest molecular weight achievable in the synthesis of pentaerythritol-tetra-(3,5-ditertiary-butyl-4-hydroxy-phenyl-propionic acid) ester is about 1200. Although these stabilizers have a relatively low water solubility in many cases, they are extremely soluble in organic solvents such as petroleum ether, carbon tetrachloride, trichloroethylene, ketones, alcohols or acids. This is definitely disadvantageous for the stabilization of Spandex filaments since such filaments are often treated with solvents or solvent emulsions in the course of finishing processes to remove any dressing agents present. Stabilizers are also frequently lost during the production of Spandex filaments and even before the final processing stage is reached. For example, in dry spinning operations the stabilizer is often lost during the evaporation of dimethylformamide in the hot spinning shaft; in wet spinning operations the stabilizer is often lost during the coagulation of the spinning solution since the stabilizer migrates into the aqueous phase with the solvent (for example dimethylformamide).

The incorporation into polyurethane of phenols which are substituted by two amino groups in the benzene ring such as, for example, 2,4-diamino-phenol or 2,4-diamino-naphthol, has also been proposed. However, polyurethanes which are thus stabilized undergo exceptionally strong discoloration on exposure to light and are not stable to degradation caused by the action of light and/or oxygen. Such stabilizers are therefore of little or no utility in the production of white polyurethane filaments intended for textile processes (see Comparison tests). Further, polyurethanes in which the radical obtained from ortho-hydroxybenzophenone has been built into the molecule as a stabilizer undergo a disadvantageous yellow discoloration under the action of alkalies.

It is therefore an object of this invention to provide polyurethanes stabilized against discoloration and degradation, containing 0.1 to 10% by weight of a structural segment of the formula

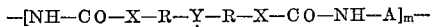
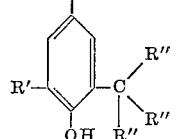

wherein R' is a hydrogen atom or an alkyl group containing 1 to 12 carbon atoms; R'' is a lower alkyl radical;

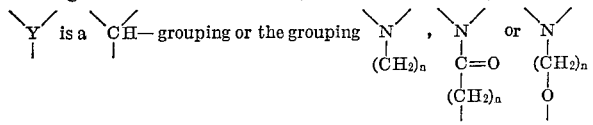

X is an oxygen atom or the NH group; R is a difunctional, straight chained or branched alkylene radical having 1 to 6 carbon atoms, a —CO—NH—group, a —CH$_2$—CO—NH—group, a —CH$_2$—CO—NH—R'''—group, a CH—NH—R'''—group and R—X may also be an NH—group, and R''' a straight chained or branched alkylene group with 1 to 6 carbon atoms, $n$ is an integer of 1 to 5 inclusive; A is a difunctional aliphatic, araliphatic or aromatic radical and $m$ is an integer of from 1 to 100.

It is an other object of this invention to provide a process for the production of polyurethanes stabilized against discoloration and degradation which comprises reacting a higher molecular weight polyhydroxy compound, a diisocyanate, a chain lengthening agent and 0.1 to 10% by weight of a phenol which contains at least one tertiary alkyl group in the ortho position to the hydroxy group and one aliphatic radical having two groups which are reactive with isocyanates.

A further object of this invention is to provide a unique stabilizer for elastomeric polyurethanes in general and stabilized polyurethane filaments in particular.

A still further object of this invention is to provide polyurethanes which are stable to the degradative effects of light, air and elevated temperatures and where the stabilizer is built into the polyurethane.

A still further object of this invention is a process for synthesizing stabilized polyurethanes by using a bifunctional NCO-reactive stabilizer of the phenol type in the polyurethane synthesis.

A still further object of this invention is in general stabilized polyurethanes and stabilized polyurethane filaments from which the built-in stabilizer cannot be extracted by washing or dry-cleaning procedures.

The foregoing objects and others which will become apparent from the following description are accomplished in accordance with this invention, generally speaking, by providing as a bifunctional NCO-reactive stabilizer of the phenol type for elastomeric polyurethanes in general and polyurethane filaments in particular, a phenol which contains at least one tertiary alkyl group in the ortho position to the hydroxyl group and one aliphatic radical having two groups which are reactive with NCO groups, the aliphatic radical being connected either directly to the phenol or indirectly connected thereto through an oxygen atom. In the preparation of a polyurethane, the stabilizer of this invention is present as a reactant at a concentration of from about 0.1 to about 10 percent by weight based on the weight of the polyurethane.

In the preparation of the stabilized polyurethane, the bifunctional NCO-reactive stabilizing phenolic compound reacts with its reactive XH-endgroups, e.g. aliphatic hydroxyl groups, hydrazide or amino groups (see formula below), with the NCO-compounds thus forming a typical segment in the polyurethane (see formula below). The sterically hindered phenolic hydroxyl group in the stabilizing phenolic compound does not react with the isocyanates under usual reaction conditions.

Suitable phenols substituted in the ortho position by at least one tertiary alkyl group and carrying groups that are reactive with isocyanate groups on aliphatic side chains are compounds of the formula

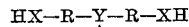
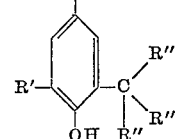

wherein R' is a hydrogen atom, an alkyl group containing 1 to 12 carbon atoms, especially tertiary alkyl such as tertiary butyl or tertiary amyl; R'' denotes a lower alkyl radical having preferably from 1 to 6 carbon atoms; —Y— denote a

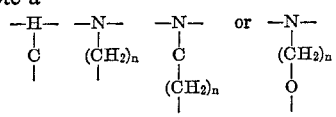

grouping in which $n$ is an integer of 1 to 5 inclusive; X denotes oxygen or an NH group; R denotes a divalent straight chained or branched alkylene radical having preferably one to six carbon atoms, a CO—NH-group, a CH$_2$—CO—NH group, a CH$_2$—CO—NH—R''' group or a CO—NH—R''' group, R''' is a straight chained or branched alkylene group, preferably having 1 to 6 carbon atoms and R—X may also denote an NH group.

When the phenolic stabilizers of this invention are reacted with diisocyanates of the general formula OCN—A—NCO or NCO prepolymers which are prepared from higher molecular weight polyhydroxy compounds and diisocyanates in the preparation of a polyurethane, the polymer segments in which the stabilizer is incorporated have the structure:

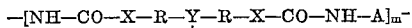
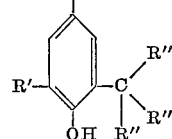

wherein X, R, R', R'' and Y have the meanings set forth hereinbefore, A denotes a divalent aliphatic, araliphatic or aromatic radical and $m$ is an integer of from 1 to 100, preferably 1 to 10, and most preferably 1. A relatively high molecular weight stabilizer capable of being reacted into a polyurethane polymer may be obtained by adding the reactive monomeric phenol stabilizer of this invention to the first stage of the polyurethane reaction and reacting it with less than a molar quantity of the diisocyanate. The high molecular weight stabilizer thus formed has the formula

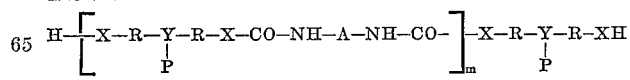

wherein $m$ is an integer of from 1 to 99, preferably 1 to 9, and P is the same phenol grouping connected to the Y in Formula I. The diisocyanates which may be used to prepare this high molecular weight stabilizer include both low molecular weight diisocyanates and so-called NCO prepolymers prepared from higher molecular weight polyhydroxy compounds and excess molar quantities of diisocyanates; for example in an OH/NCO ratio of 1:1.3 to 1:4.0.

Some suitable reactive tertiary alkyl substituted phenol stabilizers of this invention are, for example, 3,5-ditertiary butyl-4-hydroxyphenyl-N-(b-hydroxyethyl)-propylamine;
3,5-ditertiary butyl-4-hydroxyphenyl-N-(b-hydroxypropyl)-ethylamine;
3,5-di-tertiaryamyl-4-hydroxyphenyl-N-(b-hydroxypropyl)-butylamine;
3,5-di-tertiary butyl-4-hydroxyphenyl-N-(b-hydroxypropyl)-propylamine;
3,5-di-tertiary butyl-4-hydroxyphenyl-N,N-bis-(b-hydroxypropyl)-propylamine;
3,5-di-tertiary butyl-4-hydroxyphenyl-N,N-bis-(b-hydroxyethyl)-propylamine;
3,5-di-tertiary butyl-4-hydroxyphenyl-propionic acid-N,N-bis-(b-hydroxyethyl)amide;
3,5-di-tertiary butyl-4-hydroxyphenyl-propionic acid-N,N-bis-(b-hydroxypropyl)-amide;
3,5-di-tertiary butyl-4-hydroxyphenyl-acetic acid-N,N-bis-(hydroxyethyl)-amide;
3,5-di-tertiary butyl-4-hydroxyphenyl-propionic acid-N,N-bis-(b-hydroxyethyl)hydrazide;
3,5-di-tertiary butyl-4-hydroxyphenyl-N,N-bis-(b-aminoethyl)-propylamine;
3,5-di-tertiary butyl-4-hydroxyphenyl-N,N-bis-(b- aminoethyl)-ethylamine;
3,5-di-tertiary butyl-4-hydroxyphenyl-N,N-bis-(g-aminopropyl)-propylamine;
3,5-di-tertiary butyl-4-hydroxyphenyl-propionic acid-N,N-bis-(g-aminopropyl)-amide;
2-(3',5'-di-tertiary butyl-4'-hydroxyphenyl)-succinic acid dihydrazide;
2-(3',5'-di-tertiary butyl-4'-hydroxyphenyl)-succinic acid N,N'-bis-(b-hydroxyethyl)-diamide; 2-(3',5'-di-tertiary butyl-4'-hydroxyphenyl)-succinic acid N,N'-(b-hydroxypropyl)-diamide;
2-3',5'-di-tertiary butyl-4'-hydroxyphenyl)-butanediol-(1,4);
3,5-di-tertiary butyl-4-hydroxyphenyl-N,N-(bis-hydroxyethyl)-g-aminopropyl ether;
3,5-di-tertiary butyl-4-hydroxyphenyl-N,N-(bis-hydroxypropyl)-g-aminopropyl ether;
3,5-di-tertiary butyl-4-hydroxyphenoxypropionic acid-N,N-bis-hydroxyethylamide; 3-tertiary butyl-5-isopropyl-4-hydroxyphenylpropionic acid N,N-bis-(b-hydroxyethyl)-amide; 3-tertiary butyl-4- hydroxyphenylpropionic acid-N,N-bis-(-hydroxypropyl)-amide and the like and mixtures thereof.

These phenols can be prepared by known processes such as, for example, by the reaction between the corresponding phenol alkylamine and one or two mols of an alkylene oxide; any reaction between phenol carboxylic esters and bis(hydroxyalkyl)-amines (e.g. diethanolamine); by the addition of unsaturated dicarboxylic acid esters (for example dimethylmaleate) to the corresponding phenols (for example, 2,6-di-tertiary butyl phenol); by the reaction between ester groups and hydrazine to form the dihydrazide; by the reaction between the two mols of an hydroxyalkylamine (for example ethanolamine) to form bishydroxyalkylamide; by the reduction of the ester groups to hydroxy groups by known processes and by the reduction of dinitriles, for example those obtained by the addition of acrylonitrile to aminoalkyl compounds, to diamines. In detail suitable methods of synthesis are given in the examples.

The polyurethane elastomers of this invention may be obtained by the diisocyanate polyaddition process from polyhydroxy compounds, particularly linear polyhydroxy compounds containing mainly terminal hydroxy groups, having molecular weights of from about 500 to 5000 and melting points below about 60° C. Some such suitable polyols are, for example, those listed in United States Pat. No. 3,201,372, including polyesters of polycarboxylic acids and polyhydric alcohols, polyesters of lactones (for example caprolactone), polyester amides, polyethers, polyacetals, poly-N-alkylurethanes and the like and mixtures thereof. In addition, appropriate copolyols containing, for example, ester-, ether-, acetal-, amide-, urethane- or N-alkylurethane groups may be used. The melting points of the high molecular weight polyhydroxy compounds used are preferably below about 45° C. to insure good elastic and low temperature properties. The polyhydroxy compounds may also be modified with less than equivalent quantities of diisocyanates with single or multiple prelengthening. The preferred molecular weight is between about 600 and about 3000. The following polyesters are particularly suitable for use as higher molecular weight polyhydroxy compounds since they have a relatively high resistance to hydrolysis: polyesters of adipic acid, azelaic acid and sebacic acid with dihydric alcohols containing preferably at least 5 carbon atoms, or mixtures of such dihydric alcohols such as, for example, 2,2-dimethyl-propanediol-(1,3), 2,2-dimethyl-hexanediol-1(6), hexane-1,6-diol and polyesters of caprolactone, diethylene glycol and the like. One may also use polyalkylene ethers, especially polypropylene glycol ethers and polytetramethylene ether diols, the latter of which may if desired, be used in the form of mixed polyethers which may be modified by copolymerization of tetrahydrofuran with small quantities of propylene oxide, ethylene oxide, epichlorohydrin or other epoxides. In addition to the high molecular weight polyhydroxy compounds, low molecular weight diols (molecular weight below about 250) may also be used in the reaction with polyisocyanates in quantities of from about 10 percent to about 150 percent of the OH content of the higher molecular weight polyol used in the reaction. Some such suitable low molecular weight diols are, for example, ethylene glycol, butanediol, hydroquinone-bis-hydroxyethyl ether, N,N - bis-(b-hydroxypropyl)-N-methyl-amine, N,N'-bis-(b-hydroxyethyl)-piperazine and the like.

Any suitable diisocyanate may be used in the preparation of the polyurethane of this invention including mixtures thereof. Some such suitable diisocyanates include 4,4'-diphenylmethane diisocyanate, 4,4'-diphenyldiisocyanate, the isomeric tolylene diisocyanates (2,4 and/or 2,6), para- and/or meta-xylylene diisocyanate, hexamethylene diisocyanate, cyclohexane diisocyanate, dicyclohexylmethane-4,4'-diisocyanate and the like commercially available diisocyanates. In addition, diisocyanates such as 1,4-bis-b,b'-ethyl-phenylene diisocyanate, isomeric mixtures of carbodiimide-containing derivatives of diphenylmethane-4,4'-diisocyanate, dimeric diisocyanates and diisocyanates such as those listed in, for example, German patent specification No. 1,157,386 and Canadian Pat. No. 698,636 may also be used.

Chain lengthening agents which may be used in the preparation of the high molecular weight urethane elastomers of this invention by reaction with the NCO prepolymers described herein include preferably, relatively low molecular weight compounds (molecular weight preferably from about 18 to about 400, especially about 18 to about 275) that are difunctional with respect to isocyanates. Some such compounds include, for example, water, aliphatic, araliphatic, aromatic and heterocyclic diamines, hydrazines or "dihydrazide" compounds such as carbodihydrazide, dicarboxylic acid dihydrazides, biscarbazic acid esters, bis-semicarbazides and the like.

Some particular examples of suitable chain lengthening agents which may be used either separately or as mixtures include water, ethylene diamine, 1,2-propylene diamine, 1,3-propylene diamine, 1,6-hexamethylene diamine, 1,3- and 1,4-cyclohexane diamine, hexahydro-m-xylylene diamine, m-xylylene diamine, p-xylylene diamine, a,a,a',a'-tetramethyl-p-xylylene diamine, hydroqinone-bis-(w-aminopropyl)-ether, piperazine, 2,5 - dimethyl piperazine, N,N'-dimethyl-N,N'-bis-(g-aminopropyl)-ethylene diamine, piperazine - N,N' - bis(g-propylamine), 4,4-diamino-diphenylmethane, 4,4'-diamino-diphenyldimethylmethane, 1,2-bis-(hydroxylamino)-ethane, w-amino-acetic acid hydrazide, piperazine-N,N-dipropionic acid dihydrazide, ethylenediamine-N,N'-dimethyl-N,N'-dipropionic acid dihydrazide, carbodihydrazide, oxalic acid dihydrazide, malonic acid dihydrazide, p-phenylene-diacetic acid dihydrazide, hydroquinone ether diacetic acid dihydrazide, hydracrylic acid dihydrazide, glutaric acid dihydrazide, m-xylylene dicarboxylic acid dihydrazide and hydrazine (or hydrazine hydrate) or N,N'-diaminopiperazine, and aliphatic and araliphatic diamines such as listed in U.S. Pat. 3,201,372. Preferably ethylene diamine, carbodihydrazide, 4,4'-diamino-diphenylmethane, hydrazine, water and mixtures thereof are used as chain lengthening agents, and the diamines and hydrazine are preferably reacted in the form of their $CO_2$ adducts.

Compounds which contain more than two hydrogen atoms which are reactive with NCO groups such as, for example, trimethylolpropane and those listed in U.S. Pat. 3,201,372, may be used in the production of cross-linked elastomers or foam plastics. Further, each of the reaction stages in the preparation of the polyurethane may be carried out in the presence of any suitable catalyst for isocyanate reactions such as, for example, tertiary amines, tin compounds such as, for example, those listed in the Journal of Applied Polymer Science, vol. IV, Iissue No. 11, pp. 207–211 (1960), British Pat. 876,434, German Pat. 958,774 and the like.

It is preferred that, in addition to the urethane groups formed by the reaction of isocyanato groups with compounds which contain OH end groups, the polyurethane contains —NH—CO—NH— groups formed by the reaction between NCO groups and water or compounds which contain $NH_2$ groups such as diamines, dihydrazides, carbodihydrazide, hydrazine, amino alcohols and the like. It is also preferred that the polyurethane have a substantially linear segmented molecular structure, molecular weights above about 10,000 and that they be soluble in highly polar solvents such as dimethylformamide, dimethylacetamide, and the like. The structure of such polyurethanes can be characterized substantially by the structural unit:

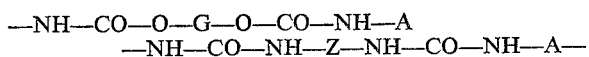

wherein A denotes a divalent aliphatic, araliphatic or aromatic radical derived from a diisocyanate, G denotes the residue remaining after the removal of the terminal hydroxyl groups from a polyhydroxy compound having a molecular weight of from about 500 to about 5,000 and a melting point below about 60° C. such as e.g. a polyalkylene ether, polyester, polyacetal or poly-N-alkylurethane, and Z denotes the residue remaining after the removal of the terminal amino groups from a divalent chain lengthening agent having terminal $NH_2$ groups such as e.g. an aliphatic, araliphatic, aromatic or heterocyclic radical, an HN—CO-alkylene-CO—NH radical an HN—CO-arylene-CO—NH radical, an NH—CO—NH radical, an NH—CO—CO—NH radical or a >N—N< linkage. Cellular polyurethane foams may be prepared by each of the processes described in Ullmann "Enzyklopädie der Technischen Chemie," 3rd edition, vol. 14, pp. 355 to 358. Cross-linked elastomers may be prepared by each of the methods given in Ullmann ibd., pages 346 to 350.

The bifunctional NCO-reactive stabilizers of this invention may be incorporated into the polyurethanes or their precursors of this invention at practically any stage in the preparation of the polyurethanes as long as there is still following a step wherein a diisocyanate or NCO prepolymer is a reactant. Thus, e.g. the NCO reactive antioxidant stabilizers of this invention, and preferably those in which the XH radical consists of aliphatically bonded hydroxyl groups, can be reacted with polyisocyanates in the melt or in inert solvents together with the higher molecular weight polyhydroxy compounds and, if desired, additional chain lengthening agents to form directly high molecular weight polyurethanes such as, for example, elastomers or foam plastics.

In the preparation of cellular foams or in one shot processes for polyurethane elastomers the bifunctional NCO-reactive stabilizers are mixed with the higher molecular weight polyhydroxyl compounds and then the reaction with the polyisocyanates is carried out.

The polyurethane fibers, foils and coatings are advantageously prepared by making a substantially linear NCO containing prepolymer from bifunctional, high molecular weight polyhydroxy compounds and diisocyanates, preferably in a molar ratio of from about 1:1.25 to 1:4, in the melt or in solution. The product is then reacted in polar organic solvents such as, for example, dimethylformamide with chain lengthening agents to form a viscous elastomer solution which is then converted into shaped articles by the usual processes, with coincidental removal of the solvent.

The incorporation of the tertiary alkyl substituted phenolic antioxidants, preferably if they contain aliphatic hydroxyl groups as the reactive constituent by which the incorporation is achieved, can take place during the formation of the NCO-containing prepolymer by adding suitable quantities of such phenols to the reaction mixture of higher molecular weight polyhydroxy compounds and diisocyanates. In this procedure, the phenols which are capable of being incorporated are dissolved in the polyhydroxy compound, if desired with the addition of other low molecular weight compounds such as dihydric alcohols which may contain tertiary amino groups, and reacted with the polyisocyanates in the melt or in inert solvents, such as dioxane, chlorobenzene or methylene chloride, at temperatures between about room temperature and about 130° C. and preferably about 70° to about 100° C. This reaction in which the NCO-containing prepolymer is formed may also take place continuously, the reactants being metered into a reaction chamber with adequate means for mixing the reactants, at suitable reaction temperatures and for suitable reaction times.

An NCO-containing prepolymer obtained in this way can be reacted in highly polar organic solvents containing amide, sulphoxide or sulphone groups, and preferably in dimethyl formamide, dimethylacetamide or dimethylsulphoxide, with approximately equivalent molar quantities of chain lengthening agents such as water, diamines, hydrazine, carbohydrazide or dihydrazides at temperatures between about 0° and about 100° C., but preferably at from about room temperature to about 70° C., to form a viscous elastomer solution. The reaction may be carried out continuously in a mixing zone, if desired. Incorporation of the tertiary alkyl substituted phenol stabilizers as "chain lengthening agents" may also be effected at this chain lengthening stage. For this purpose, it is advisable to use those types of reactive stabilizers which contain amino or hydrazide end groups since the reactivity of the amino or hydrazide group with isocyanates is sufficiently high at room temperature and adapted to the reactivity of the usual chain lengthening agents (amines, hydrazides). Bifunctional NCO-reactive phenolic antioxidants of the type described hereinabove or, if desired, mixtures of such antioxidants can be incorporated both in the NCO-containing prepolymer and/or in the chain lengthening reaction.

In order to regulate the chain length of the polyurethanes, one may also incorporate into the polymer small quantities; that is, up to about 2% by weight, of monofunctional compounds such as, for example, butylamine, N,N-dimethylhydrazine and especially monofunctional antioxidants containing 3,5-ditertiary butyl-4-hydroxyphenyl radicals such as, for example, 3,5-ditertiary-butyl-4-hydroxyphenyl-propylamine, 3,5-ditertiary butyl-4-hydroxyphenyl-propionic acid hydrazide, 3,5-ditertiary butyl-4-hydroxyphenyl-propionic acid (b-hydroxyethyl)-amide, 3,5-ditertiary butyl-4-hydroxyphenyl g-aminopropylether and the like. Pigments, dyes, optical brightening agents, UV absorbents, special light protective agents such as N,N-dialkyl-semicarbazides or N,N-dialkyl hydrazides or cross-linking agents such as polyisocyanates, polyethylene imides, polymethylol compounds, polymethylolethers or (para)-formaldehyde may be added to the elastomer solutions obtained in the usual manner.

The following compounds are examples of usual unreactive UV absorbents or light protective additives which may be used as additional stabilizers: 2-ortho-hydroxy-phenyl-benzo-triazole derivatives such as 2-(2'-hydroxy-3'-tertiary-butyl-5'-methylphenyl) - 5 - chloro-benzotriazole, ortho-hydroxy benzophenone derivatives such as 2,4,2'-trihydroxy-5-tertiary-butyl-benzophenone, phenolic stabilizers such as 2,2'-dimethyl-4,4'-dihydroxy-5,5'-ditertiary-butyl-diphenylisopropylmethane; 1,3,5-trimethyl-tris-(3,5-ditertiary butyl-4-hydroxyphenyl)-benzene; 1,2,4,5-tetramethyl-3,6-bis-(3,5 - ditertiary butyl - 4 - hydroxyphenyl)-benzene; 2,5-ditertiaryamylhydroquinone; pentaerythritol-tris- or tetraesters of 3,5-ditertiary butyl-4-hydroxyphenyl-propionic acid or alkyl or aryl phosphites such as triphenylphosphite, tribenzylphosphite or polyerythritol phosphite or alkyl or aryl phosphines such as triphenylphosphine and thiodipropionic acid esters such as thiodipropionic dilaurate. The use of mixtures of the above types of stabilizers produces a synergistic effect in some cases. These additional stabilizers can, however, be washed out with boiling water or solvents and some are colored yellow.

Any of the NCO-reactive stabilizers of this invention may also be simply added as additives to the finished polyurethanes. In that case, however, although the stabilizers of this invention have a stabilizing effect, they can be more or less easily washed out or dissolved out of the polyurethane to substantially reduce or diminish that stabilizing effect. (See comparison examples in Tables I and II.)

The usual wet and dry spinning processes may be used to produce elastomer filaments from the polyurethanes of this invention. Coatings can be obtained by applying a solvent solution of the polyurethanes of this invention with a wiper and removing the solvent by evaporation. Microporous films or coatings can be obtained by coagulation of the elastomer solution in aqueous precipitation baths under certain conditions.

The invention is further illustrated but is not intended to be limited by the following examples in which all parts and percentages are by weight unless otherwise specified.

EXAMPLE 1

(a) Preparation of the stabilizer-containing NCO-containing prepolymer

About 200 parts of a mixed polyester of adipic acid, hexane-1,6-diol and 2,2-dimethylpropane-1,3-diol (molar ratio of glycols 65:35) having an hydroxy number of about 63.8, about 4 parts of bis-(b-hydroxypropyl)-methylamine and about 4 parts of 2-(3',5'-ditertiary butyl-4'-hydroxyphenyl)-butane-1,4-diol are heated, after homogenzing by melting, with about 57 parts of diphenyl methane-4,4'-diisocyanate and about 66 parts of dioxane for about 40 minutes at about 96° to about 98° C. to form an NCO-containing prepolymer.

(b) Chain lengthening with carbohydrazide

About 114 parts of the above described NCO-containing prepolymer solution with a built-in stabilizer is stirred into a solution of about 2 parts of carbohydrazide in about 227 parts of dimethylformamide, and the resulting viscous, colorless solution (415 poises) is pigmented with about 2.5% of TiO₂) (rutile). (For results on exposure to light, see Table II.)

(c) Chain lengthening with ethylene diamine

About 114 parts of the above described NCO-containing prepolymer solution containing a built-in stabilizer is introduced with intensive stirring into a suspension of the diamino carbonate prepared by throwing about 5 parts of solid carbon dioxide into a solution of about 1 part of ethylene diamine in about 224 parts of dimethyl formamide. CO₂ is evolved and a highly viscous, homogeneous, colorless elastomer solution (232 poises) is formed which is pigmented by the addition of about 2.5% of TiO₂. (For results of exposure to light, see Table I.)

(d) Preparation of stabilizer

About 8 parts of lithium aluminium hydride in about 150 ml. of dioxane are added to about 35 parts of the dimethyl ester of (3,5-ditertiary butyl-4-hydroxyphenyl)-succinic acid (M.P. of ester 92° C.) in about 150 parts of anhydrous dioxane and the reaction mixture is heated for about 3 hours at about 100° C. and then under pressure for about 5 hours at about 135° C. The alcoholate complex is decomposed by careful addition of aqueous dioxane followed by about 1000 parts of water and hydrochloric acid until the reaction mixture is weakly acid, and the reaction product is taken up in ether. About 34 parts of the dihydric alcohol is obtained from the washed ether solution. After recrystallization from petroleum ether, the melting point of the resulting 2-(3',5'-ditertiary butyl - 4' - hydroxyphenyl) - butanediol - (1,4) is about 131° C.

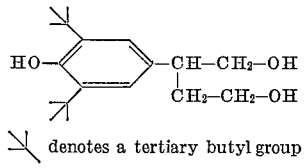

∖| denotes a tertiary butyl group

EXAMPLE 2

(a) Preparation of stabilizer-containing NCO-containing prepolymer

About 200 parts of the mixed polyester (OH number about 63) described in Example 1, about 4 parts of bis-(b-hydroxypropyl)-methylamine and about 4 parts of 3,5-ditertiary butyl-4-hydroxyphenylpropyl-N,N - bis - (b - hydroxypropyl)-amine are mixed together and heated with about 56 parts of diphenylmethane diisocyanate and about 66 parts of dioxane for about 40 minutes at about 96° C.

(b) Chain lengthening with carbohydrazide

About 2 parts of carbohydrazide are dissolved in about 226 parts of hot dimethylformamide and stirred together with about 118 parts of the above described NCO-containing prepolymer. The resulting elastomer solution (208 poises) is pigmented with about 2.5%, based on the weight of the elastomer, of TiO₂ (rutile). (For results on exposure to light, see Table II.)

(c) Chain lengthening with ethylene diamine

About 5 parts of solid carbon dioxide are added to a solution of about 1 part of ethylene diamine in about 225 parts of dimethylformamide and the reactants are then mixed with about 118 parts of the above described NCO-containing prepolymer. After pigmentation with about 2.5% of TiO₂ (rutile), the viscosity of the solution is 180 poises. (For results on exposure to light, see Table I.)

(d) Preparation of stabilizers

About 26 parts of 3,5-ditertiary butyl-4-hydroxy-phenyl-propylamine prepared as described in Example 3 are heated in an autoclave at about 150° C. for about 8 hours together with about 15 parts of propylene oxide. After removal of excess propylene oxide by distillation, about 36 parts of a highly viscous, brown oil is obtained which is distilled in a high vacuum at about 218° to about 220° C./0.15 mm. Hg, and about 30 parts of 3,5-ditertiary butyl - 4 - hydroxy - phenylpropyl - N,N - bis - (b - hydroxypropyl)-amine are obtained in the form of a pale yellow, highly viscous oil which crystallizes when left to stand for some time.

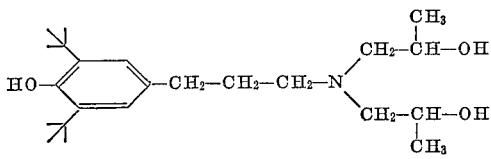

EXAMPLE 3

(a) Preparation of stabilizer-containing NCO-containing prepolymer

About 200 parts of a mixed polyester of adipic acid, hexane-1,6-diol and 2,2-dimethylpropane-1,3-diol having a molecular weight of about 1760, about 4 parts of bis-(b-hydroxypropyl)-methylamine and about 4 parts of 3,5 - tertiary butyl - 4 - hydroxyphenyl - N - (b - hydroxypropyl)-propylamine are heated with about 57 parts of diphenylmethane-4,4'-diisocyanate and about 67 parts of dioxane for about 40 minutes at about 96° to about 98° C., and the NCO-containing prepolymer solution obtained is then cooled to room temperature.

(b) Chain lengthening with carbohydrazide

About 118 parts of the above described NCO-containing prepolymer solution are introduced with vigorous stirring into a solution of about 2 parts of carbohydrazide in about 226 parts of dimethylformamide at about 50° C. and are then pigmented with about 2.5% of rutile (based on the solids content of the elastomer) (302 poises/20° C.). (For results on exposure to light, see Table II.)

(c) Chain lengthening with ethylene diamine

About 118 parts of the above described NCO-containing prepolymer solution are stirred into a suspension prepared from a solution of about 1 part of about 98% ethylene diamine in about 223 parts of dimethyl formamide by the addition of about 2 to 3 parts of solid carbon dioxide and the resulting elastomer solution is given a pigment content of about 2.5% by the addition of about 6 parts of an approximately 33% $TiO_2$ (rutile)/dimethylformamide paste (208 poises/20° C.). (For results on exposure to light, see Table I.)

(d) Preparation of stabilizer

About 520 parts of 2,6-ditertiary butyl-phenol are introduced at room temperature into a solution of about 30 parts of potassium in about 2500 parts of tertiary butanol; about 229 parts of acrylonitrile is then added and the reaction mixture is kept at about 50° to about 60° C. for about 12 hours. The reaction mixture is poured onto about 10,000 parts of ice water and neutralized, and the precipitated crystals are separated by filtration under suction (about 440 parts, pale yellow, M.P. about 113° to about 114° C.). After recrystallization from petroleum ether over animal charcoal, about 418 parts of 3,5-ditertiary butyl-4-hydroxyphenyl-propionitrile, M.P. about 116° C., are obtained. Other constituents of the nitrile, in addition to tertiary butoxypropionitrile and unchanged 2,6-ditertiary butylphenol, can be isolated from the oily constituents obtained in the aqueous processing.

About 370 parts of 3,5-ditertiary butyl-4-hydroxyphenyl propionitrile is hydrogenated for about 2 hours at about 80° C. in about 1300 parts of methanol, about 170 parts of liquid ammonia and about 70 parts of Raney cobalt. After filtration and removal of the solvent by distillation, about 371 parts of crystals having a melting point of about 120° to about 123° C. are obtained which, after recrystallization from petroleum ether/animal charcoal, yields about 312 parts of pure 3,5-ditertiary butyl-4-hydroxy-phenyl-g-propylamine, M.P. about 122° to about 123° C.

About 26 parts of 3,5-ditertiary butyl-4-hydroxy-phenyl propylamine are heated under reflux for about 12 hours with about 15 parts of propylene oxide and about 40 parts of dioxane. After removal of the solvent by evaporation, an oil which is partly crystallized is obtained, which on recrystallization from petroleum ether yields about 12 parts of the propylene oxide monoadduct in crystalline form. The melting point of 3,5-ditertiary butyl-4-hydroxyphenyl-N-(b-hydroxypropyl)-propylamine is about 108° C.

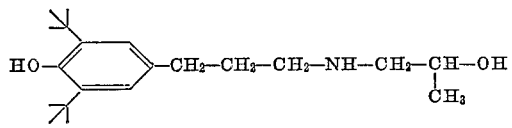

Comparison Example A

About 1200 parts of a mixed polyester (molecular weight about 1670) of adipic acid, hexane-1,6-diol and 2,2-dimethylpropane-1,3-diol, about 24 parts of bis-(b-hydroxypropyl)-methylamine and about 343 parts of diphenylmethane-4,4'-diisocyanate are heated to about 96° C. for about 50 minutes. About 524 parts of this NCO-containing prepolymer solution are introduced into a suspension prepared from about 8 parts of ethylene diamine, about 1 part of dimethylformamide and about 15 parts of solid carbon dioxide, pigmented with about 2.5% of $TiO_2$ (rutile) and treated with about 0.3 part of hexane-diisocyanate to yield an elastomer solution having a viscosity of about 450 poises/20° C.

The elastomer solution is divided into portions, some of which are used without an additive while others are treated with about 1.5% by weight of the elastomer substance, of light protective agents which are capable of being incorporated into the polymer molecule but are in this case only contained in solution form. Part of the ealstomer films and filaments are extracted with carbon tetrachloride for about one hour and then exposed to light as set forth in Tables I and II. The test results on samples treated in this way show that light protective agents which are only used as additives are seriously deficient in their effectiveness.

Comparison Example b

About 200 parts of the polyester used in Example 1, about 4 parts of bis-(b-hydroxypropyl)-methylamine, about 57 parts of diphenylmethane-4,4'-diisocyanate and about 66 parts of dioxane are heated at about 98° C. for about 40 minutes to form an NCO-containing prepolymer. When this prepolymer is chain lengthened with 2,4-diaminophenol in a manner analogous to that described in U.S. Pat. 3,009,901, an elastomer solution having a low viscosity is obtained which rapidly turns a very dark color on exposure to light.

When the said prepolymer is chain lengthened with a mixture of about 90 mol percent of ethylene diamine and about 10 mol percent of 2,4-diaminophenol, a pale brown solution is obtained. A film produced from this pale brown solution undergoes strong discoloration when exposed ot light in the Fadeometer for only a few hours.

When the NCO-containing prepolymer is chain lengthened with about 90% of carbohydrazide and about 10 mol percent of 2,4-diaminophenol, an elastomer solution is obtained which shows brown discoloration when left to stand.

The results show that very undesirable effects are obtained when 2,4-diaminophenol is used as chain lengthening agent due to the great tendency of that substance or of the elastomer substances produced from it to discolor.

Mechanical testing of the stabilized elastomers:

The elastomer solutions are poured onto glass plates to form layers of about 1 mm. in thickness and the solvent is evaporated off at about 100° C. The foils obtained (about 0.17 to 0.20 mm. thickness) are cut with a foil cutting machine into filaments having a thickness of from about 750 to about 1000 denier. The cut filaments may be extracted or washed, if desired, and they are then exposed in a Fadeometer for a given number of hours and then tested for tensile strength and elongation at break.

TABLE 1

| | | Stabilizer built into polyurethane | | | | | | | | | 1.5% stabilizer only dissolved in as additive | | | | | | | |
|---|---|---|---|---|---|---|---|---|---|---|---|---|---|---|---|---|---|
| | | Filaments built into polyurethane | | | | Filaments extracted for 1 hour with carbon tetrachloride | | | | | Filaments extracted for 1 hour with carbon tetrachloride | | | |
| Example No. | Fadeometer exposure (in hours) | TS, g./den. | Elongation, percent | TS (break), g./den. | Discoloration | TS, g./den. | Elongation, percent | TS (break), g./den. | Discoloration | TS, g./den. | Elongation, percent | TS (break), g./den. | Discoloration |
| 1c | Originally | 0.50 | 750 | 4.25 | Colorless | 0.50 | 720 | 4.16 | Colorless | 0.50 | 695 | 3.99 | Colorless. |
| | 22 | 0.46 | 650 | 3.44 | do | 0.43 | 692 | 3.40 | do | 0.29 | 465 | 1.64 | Yellowish. |
| | 44 | 0.29 | 592 | 2.02 | Yellowish | 0.33 | 675 | 2.59 | Yellowish | 0.13 | 365 | 0.60 | Yellowish. |
| | 66 | 0.21 | 550 | 1.38 | Yellow | (¹) | (¹) | (¹) | Yellow | (¹) | (¹) | (¹) | |
| 2c | Originally | 0.41 | 720 | 3.37 | Colorless | 0.41 | 740 | 3.42 | Colorless | 0.43 | 700 | 3.44 | Colorless. |
| | 22 | 0.37 | 700 | 2.94 | do | 0.345 | 700 | 2.73 | do | 0.18 | 465 | 1.0 | Yellow. |
| | 44 | 0.26 | 675 | 2.01 | Yellowish | 0.21 | 600 | 1.47 | Yellowish | 0.10 | 280 | 0.37 | Deep yellow. |
| | 66 | 0.20 | 650 | 1.50 | Yellow | | | | do | (¹) | (¹) | (¹) | |
| 3c | Originally | 0.48 | 765 | 4.17 | Colorless | 0.48 | 760 | 4.16 | Colorless | 0.45 | 694 | 3.58 | Colorless. |
| | 22 | 0.36 | 610 | 2.50 | do | 0.34 | 675 | 2.64 | do | 0.18 | 485 | 1.06 | Yellow. |
| | 44 | 0.28 | 560 | 1.85 | Yellowish | 0.27 | 630 | 1.97 | Yellowish | 0.08 | 175 | 0.22 | Deep yellow. |
| | 66 | 0.12 | 400 | 0.60 | Yellow | | | | Yellow | (¹) | (¹) | (¹) | Do. |
| See Example a without stabilizer | Originally | 0.57 | 730 | 4.73 | Colorless | | | | | | | | |
| | 22 | 0.20 | 485 | 1.17 | Yellow | | | | | | | | |
| | 44 | 0.08 | 265 | 0.29 | Deep yellow | | | | | | | | |
| | 66 | 0.07 | 155 | 0.18 | do | | | | | | | | |

¹ Very low tensile strength.

TABLE II

| | | Stabilizer built into polyurethane (1.5%) | | | | 1.5% stabilizer only dissolved as additive into the elastomer solution | | | |
|---|---|---|---|---|---|---|---|---|---|
| Example No. | Fadeometer exposure in hours | TS, g./den. | Elongation, percent | TS (break), g./den. | Discoloration | TS, g./den. | Elongation, percent | TS (break), g./den. | Discoloration |
| 4c | Originally | 0.64 | 715 | 5.25 | Colorless | 0.55 | 772 | 4.80 | Colorless. |
| | 22 | 0.50 | 605 | 3.55 | do | 0.30 | 570 | 1.98 | Yellowish. |
| | 44 | 0.26 | 525 | 1.65 | Yellowish | 0.19 | 520 | 1.17 | Do. |
| | 66 | 0.16 | 395 | 0.78 | Yellow | 0.07 | 175 | 0.19 | Yellow. |
| 4b | Originally | 0.75 | 675 | 5.80 | Colorless | | | | |
| | 22 | 0.65 | 615 | 4.70 | do | | | | |
| | 44 | 0.32 | 445 | 1.73 | Yellowish | | | | |
| | 66 | 0.20 | 382 | 0.96 | Yellow | | | | |
| 1b | Originally | 0.69 | 770 | 6.05 | Colorless | | | | |
| | 22 | 0.55 | 615 | 3.93 | do | | | | |
| | 44 | 0.40 | 595 | 2.80 | Yellowish | | | | |
| | 66 | 0.30 | 525 | 1.87 | Yellow | | | | |
| 2b | Originally | 0.56 | 760 | 4.84 | Colorless | | | | |
| | 22 | 0.48 | 655 | 3.63 | do | | | | |
| | 44 | 0.35 | 640 | 2.58 | Yellowish | | | | |
| | 66 | 0.26 | 565 | 1.73 | Yellow | | | | |
| 5b | Originally | 0.65 | 700 | 5.20 | Colorless | | | | |
| | 22 | 0.55 | 630 | 4.00 | do | | | | |
| | 44 | 0.40 | 580 | 2.72 | Yellowish | | | | |
| | 66 | 0.28 | 500 | 1.66 | Yellow | | | | |
| 3b | Originally | 0.65 | 785 | 5.74 | Colorless | | | | |
| | 22 | 0.56 | 640 | 4.16 | do | | | | |
| | 44 | 0.38 | 580 | 2.55 | Yellowish | | | | |
| | 66 | 0.22 | 480 | 2.26 | Yellow | | | | |
| 6c | Originally | 0.72 | 810 | 6.60 | Colorless | | | | |
| | 22 | 0.65 | 735 | 5.44 | do | | | | |
| | 44 | 0.46 | 650 | 3.45 | Almost colorless | | | | |
| See Example 6b | Originally | 0.67 | 750 | 5.70 | Colorless | | | | |
| | 22 | 0.37 | 670 | 2.86 | Yellowish | | | | |
| | 46 | 0.26 | 583 | 1.80 | Yellow | | | | |

EXAMPLE 4

(a) Preparation of stabilizer-containing NCO prepolymer

About 600 parts of the copolyester described in Example 1 (OH number about 67.8) are stirred in the melt at about 80° C. with about 18 parts of 3,5-ditertiary butyl-4-hydroxy - phenylpropionic acid (N,N-bis-b-hydroxyethyl)-amide to yield a homogeneous mixture, and converted into an NCO-containing prepolymer by heating for about one hour at about 96° to about 98° C. with about 161 parts of diphenylmethane-4,4'-diisocyanate and about 196 parts of chlorobenzene.

(b) Chain lengthening with carbohydrazide

About 211 parts of the above described NCO-containing prepolymer solution are stirred into solution of about 5 parts of carbohydrazide in about 434 parts of dimethylformamide at about 60° C., and the highly viscous solution obtained (about 900 poises) is pigmented with about 2.5% by weight of TiO₂ (based on solids content). (For results on exposure to light, see Table II.)

(c) Chain lengthening with ethylene diamine

About 261 parts of the above described NCO-containing prepolymer solution (about 2.04% NCO) are stirred at room temperature into a diaminocarbonate suspension prepared by throwing about 10 parts of solid carbon dioxide into a solution of about 4 parts of ethylene diamine in about 564 parts of dimethyl acetamide. The resulting viscous elastomer solution (about 563 poises) is pigmented with about 2.5% by weight of TiO₂ (based on solid substance). (For results on exposure to light, see Table II).

(d) Preparation of the stabilizer

About 520 parts of 2,6-ditertiary butyl-phenol are added to a solution of about 30 parts of potassium in about 2000 parts of tertiary butanol, and about 248 parts of methylacrylate are added dropwise at about 55° C. to form a suspension of the yellow salt precipitate. The resulting dark green solution is heated at from about 55° to about 60° C. for about 16 hours and then poured onto a large quantity of ice water and neutralized with hydrochloric acid. The solidifying oil is the methyl ester of (3,5-ditertiary butyl-4-hydroxyphenyl)-propionic acid and is separated by filtration under suction, washed with a large quantity of water until neutral and then dried. About 650 parts of an almost colorless ester having a melting point of about 69° to about 70°C. are obtained.

About 516 parts of the methyl ester of (3,5-ditertiary butyl-4-hydroxyphenyl)-propionic acid are heated at about 140° to about 150° C. for about 25 hours with about 516 parts of diethanolamine in an atmosphere of nitrogen. When the reaction solution is cold, water is added, the product is taken up in ether, the ether solution is washed with dilute acid, and the solvent is evaporated off. About 540 parts of (3,5-ditertiary-butyl-4-hydroxyphenyl)-propionic acid - (N,N-bis-b-hydroxyethyl)-amide are obtained in the form of an almost colorless, viscous resin.

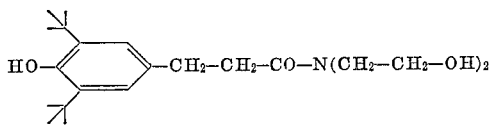

EXAMPLE 5

(a) Preparation of the stabilizer-containing NCO-prepolymer

About 200 parts of the copolyester of Example 1 (OH number about 63.8, about 4 parts of bis(b-hydroxypropyl)-methane and about 4 parts of 3,5-ditertiary butyl-4-hydroxy-phenylsuccinic acid-bis-b-hydroxyethylamide are briefly heated to about 190° C. until the reactants are homogenously distributed and then, after cooling to about 90° C., the reaction mixture is heated together with about 56 parts of diphenylmethane diisocyanate and about 66 parts of dioxane at about 96° to about 98° C. for about 40 minutes.

(b) Chain lengthening with carbohydrazide

About 2 parts of carbohydrazide are dissolved in about 226 parts of hot dimethylformamide and stirred together with about 111 parts of the above described NCO-containing prepolymer. A highly viscous solution is formed which is pigmented with about 2.5% of TiO₂ (rutile) and then diluted with about 39 parts of dimethylformamide (about 400 poises/20° C. ). (For results on exposure to light, see Table II.)

(c) Preparation of stabilizer

About 35 parts of 3,5-ditertiary butyl-4-hydroxy-phenyl succinic acid dimethyl ester are heated with about 50 parts of ethanolamine in an atmosphere of nitrogen for about 15 hours at about 150° C. The mixture which solidifies on cooling is stirred together with water and filtered and the residue is washed with about 500 parts of water to remove a water-soluble, red impurity. After drying, about 40 parts of a pale yellow compound having a melting point of about 210° C. are obtained. After recrystallization from dioxane, the melting point of the colorless 3,5-ditertiary butyl-4-hydroxy phenylsuccinic acid-bis-hydroxyethyl-amide is about 212° C.

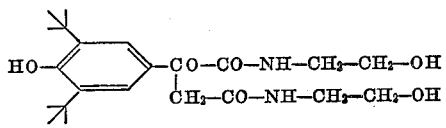

EXAMPLE 6

(a) Preparation of NCO-containing prepolymer

About 700 parts of the copolyester described in Example 1, about 14 parts of bis-(b-hydroxypropyl)-methylamine, about 196 parts of diphenylmethane-4,4-diisocyanate and about 230 parts chlorobenzene are heated for about one hour in a boiling water bath to form an NCO-containing prepolymer. The NCO content of the prepolymer after cooling to room temperature is about 1.95%.

(b) Chain lengthening with carbohydrazide (comparison test)

About 108 parts of the NCO-containing prepolymer solution are stirred into a solution of about 2 parts of carbohydrazide in about 230 parts of dimethylformamide, and the viscous solution (about 354 poises) is pigmented with about 2.5% by weight of TiO₂.

(c) Chain lengthening with carbohydrazide and 3,5-ditertiary butyl-4-hydroxyphenyl-succinic acid dihydrazide About 108 parts of the NCO-containing prepolymer solution is mixed by stirring intensively with a solution of about 2 parts of 3,5-ditertiary butyl-4-hydroxyphenyl-succinic acid dihydrazide and about 2 parts of carbohydrazide in about 230 parts of dimethyl formamide. The resulting colorless, viscous elastomer solution (about 705 poises/20° C.) is pigmented with about 2.5% by weight of TiO₂. The elastomer films obtained therefrom undergo only slight yellowing and are more stable than the elastomers of Example 6b which are prepared with carbohydrazide alone. (For results on exposure to light, see Table II.)

(d) Preparation of stabilizer

About 200 parts of 2,6-ditertiary butyl-phenyl are added to a solution of about 10 parts of potassium in about 750 parts of anhydrous tertiary butanol. A pale green crystalline paste results to which are added about 154 parts of dimethylmaleate within a few minutes at about 55° C. The reaction mixture is heated under reflux for about 8 hours. After removal of the solvent by evaporation, the residue is treated with about 750 parts of water, adjusted to neutral pH and extracted with ether. The solvent is removed by distillation from the washed ethereal solution. Distillation of the residue yields about 208 parts of the dimethylester of (3,5-ditertiary butyl-4-hydroxyphenyl)-succinic acid in the form of a highly viscous oil whch, when stirred with petroleum ether, forms colorless crystals having a melting point of about 92° C.

About 37 parts of the above described dimethyl ester are heated under reflux with about 10 parts of hydrazine hydrate in about 100 parts of ethanol for about 30 hours. About 32 parts of the dihydrazide of (3,5-ditertiary butyl-4-hydroxyphenyl)-succinic acid separate out in the form of colorless crystals having a melting point of about 237° C. (Kofler bench; with onset of decomposition).

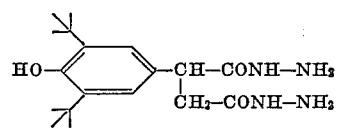

EXAMPLE 7

(a) NCO-containing prepolymer without stabilizer

About 6500 parts of the copolyester described in Example 1, about 128 parts of bis-hydroxypropyl-methylamine and about 1786 parts of diphenylmethane-4,4'-diisocyanate are heated at about 96° C. for about 150 minutes.

(b) Comparison test: without incorporation of a high molecular weight stabilizer About 12 parts of ethylene diamine and about 2 parts of propylene-1,2-diamine are dissolved in about 2136 parts of dimethyl acetamide and converted into a carbonate suspension with about 20 parts of solid carbon dioxide. About 737 parts of the molten NCO-containing prepolymer are then introduced until a solution of viscosity about 770 poises is obtained. The elastomer solution obtained is pigmented with about 4% of $TiO_2$ (rutile), based on the solids content of the elastomer. (For results of exposure to light, see Table III).

(c) Preparation of a high molecular weight stabilizer capable of molecular incorporation:

About 93 parts (about 250 mol) of 3,5-ditertiary butyl-4 - hydroxyphenyl - propyl - N,N-bis-(b-hydroxypropyl)-amine and about 38 parts (about 225 mol) of hexane-1,6-diisocyanate are heated in about 300 parts of dioxane at about 100° C. for about 10 hours. After removal of the solvent by distillation in vacuo, the high molecular weight stabilizer which contains terminal aliphatic hydroxyl groups and is in the form of an almost colorless oil remains behind. The stabilizer can be represented by the formula:

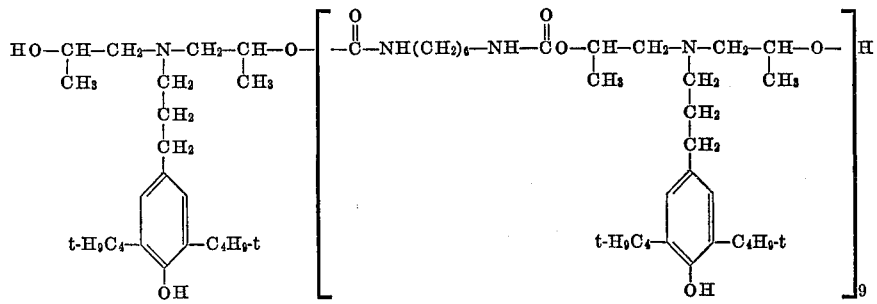

(d) Preparation of elastomer with stabilizer-containing NCO-prepolymer

About 737 parts of the NCO-containing prepolymer described in part (a) and about 22 parts of the solvent-free high molecular weight stabilizer suitable for molecular incorporation described in part (c) are thoroughly stirred together and reacted for about 20 minutes at about 98° C. The resulting NCO-containing prepolymer containing a built-in stabilizer is reacted as described in part (b) with a quantity of diamines (a mixture of about 90 mol percent of ethylene diamine and about 10 mol percent of 1,2-propylene diamine) in dimethylacetamide equivalent to the NCO content; $CO_2$ is added during the reaction. A 25% elastomer solution is formed which is pigmented with about 4% of $TiO_2$ (rutile).

Results of tests carried out before and after boiling with water on the filaments produced in the usual manner from this solution which are carried out before and after boiling with water are given in Table III. These results show that the effect of the stabilizer is not lost.

EXAMPLE 8

(a) Preparation of a high molecular weight stabilizer capable of molecular incorporation About 88 parts of 2-(3',5'-ditertiary butyl-4'-hydroxyphenyl)-butane-1,4-diol (about 300 mol) and about 45 parts (about 270 mol) of hexane-1,6-diisocyanate are heated under reflux in about 400 ml. of dioxane for about 6 hours.

(b) Preparation of elastomer with stabilizer-containing NCO-prepolymer

About 737 parts of the NCO-containing prepolymer described in Example 7a are heated at about 96° C. for about 30 minutes with about 88 parts of the solution of the higher molecular weight stabilizer described in part (a) (3% by weight of stabilizer additive based on solids content). The resulting NCO prepolymer which contains a built-in stabilizer, is chain lengthened as described in the preceding Example with a diamine mixture containing about 90 mol percent of ethylene diamine and 10 mol percent of 1,2-propylene diamine in dimethyl acetamide, with addition of carbon dioxide.

The results of tests on filaments before and after boiling for about one hour are entered in Table III.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

TABLE III.—FADEOMETER EXPOSURE OF ELASTOMER FILAMENTS (CA. 1,000 DEN.) WITH AND WITHOUT INCORPORATION OF HIGHER MOLECULAR WEIGHT STABILIZERS

| | Filaments exposed to light in the original state | | | | | Filaments exposed to light after 1 hour's boiling | | | |
|---|---|---|---|---|---|---|---|---|---|
| | Fadeometer exposure in hours | TS, g./den. | Elongation, percent | TS (break), g./den. | Discoloration | TS, g./den. | Elongation, percent | TS (break), g./den. | Discoloration |
| Example (7d) 3% higher molecular weight stabilizer (7c) incorporated | 0 | 0.60 | 787 | 5.28 | Colorless | | | | |
| | 22 | 0.41 | 700 | 3.24 | do | 0.45 | 755 | 3.83 | Colorless. |
| | 44 | 0.29 | 650 | 2.17 | do | 0.31 | 690 | 2.45 | Do. |
| | 66 | | | | | | | | |
| Example (8b) 3% higher molecular weight stabilizer (8a) built in | 0 | 0.62 | 840 | 5.82 | Colorless | 0.60 | 880 | 5.86 | Do. |
| | 22 | 0.53 | 735 | 4.42 | do | | | | |
| | 44 | 0.43 | 720 | 3.52 | do | 0.42 | 740 | 3.52 | Do. |
| | 66 | 0.41 | 695 | 3.26 | do | | | | |
| Comparison test 7b (without stabilizer) | 0 | 0.57 | 735 | 4.75 | do | | | | |
| | 22 | 0.20 | 490 | 1.18 | Yellow | | | | |
| | 44 | 0.08 | 270 | 0.28 | Deep yellow | | | | |
| | 66 | (¹) | (¹) | (¹) | | | | | |

¹ No longer measurable.

What we claim is:

1. A polyurethane stabilized against discoloration and degradation, containing 0.1 to 10% by weight based on the weight of the polyurethane of a structural segment of the formula

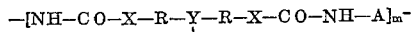
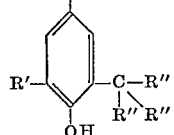

wherein R' is a hydrogen atom or an alkyl group containing 1 to 12 carbon atoms; R'' is a lower alkyl radical;

Y is a CH-grouping or the grouping

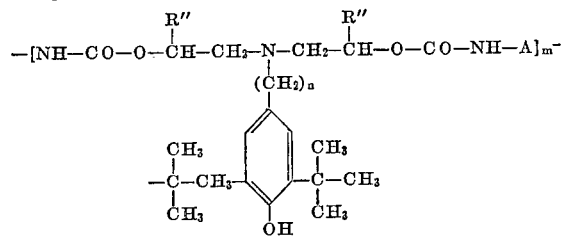

X is an oxygen atom or the NH-group;; R is a difunctional, straight chained or branched alkylene radical having 1 to 6 carbon atoms, a —CO—NH-group, a —CH$_2$—CO—NH-group a—CH$_2$—CO—NH—R''-group or a —CO—NH—R'''-group, and R-X may also be a NH group and R''' a straight chained or branched alkylene group with 1 to 6 carbon atoms; n is an integer of 1 to 5 inclusive; A is a difunctional aliphatic, araliphatic or aromatic radical and m is an integer of from 1 to 100.

2. The polyurethane of claim 1, said alkyl group containing 1 to 12 carbon atoms being a tertiary butyl group.

3. The polyurethane of claim 1 said structural segment having the formula

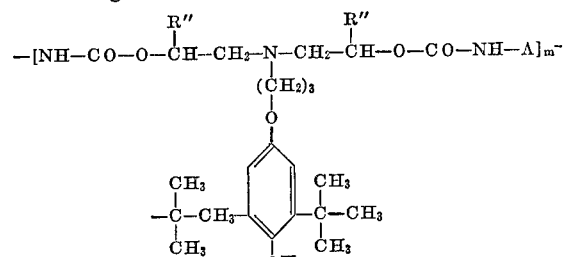

wherein A, n and m have the meaning as given in claim 1 and R'' is methyl or hydrogen.

4. The polyurethane of claim 1, said structural segment having the formula

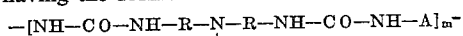
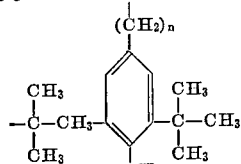

wherein R'', A and m have the meaning as given in claim 1.

5. The polyurethane of claim 1, said structural segment having the formula

—[NH—CO—NH—R—N—R—NH—CO—NH—A]$_m$—

(CH$_2$)$_n$

[bisphenol structure with CH$_3$ groups and OH]

wherein R, A, n and m have the meaning as given in claim 1.

6. The polyurethane of claim 1, said structural segment having the formula

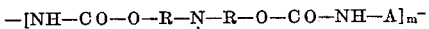
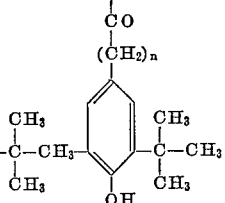

wherein R, A, n and m have the meaning as given in claim 1.

7. The polyurethane of claim 1, said structural segment having the formula

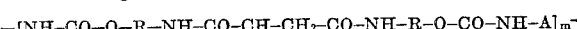
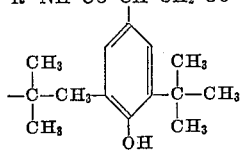

wherein R, A and m have the meaning as given in claim 1.

8. The polyurethane of claim 1, said structural segment having the formula

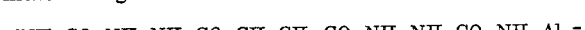
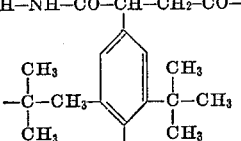

wherein A and m have the meaning as given in claim 1.

9. The polyurethane of claim 1, said structural segment having the formula

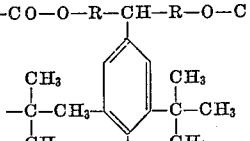

wherein R, A and m have the meaning as given in claim 1.

10. The polyurethane of claim 1, said structural segment having the formula

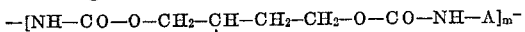
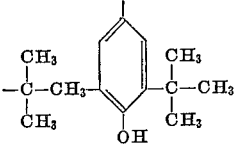

wherein A and m have the meaning as given in claim 1.

11. The polyurethane of claim 1, said structural segment having the formula

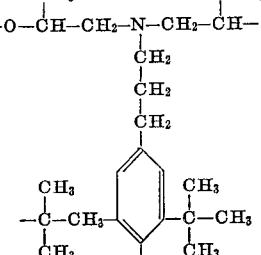

wherein A and m have the meaning as given in claim 1.

12. The polyurethane of claim 1, said structural segment having the formula

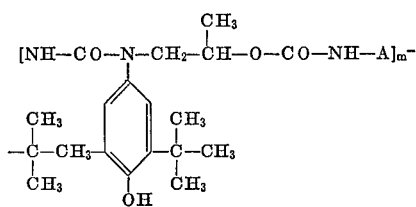

wherein A and *m* have the meaning as given in claim 1.

13. The polyurethane of claim 1, said structural segment having the formula

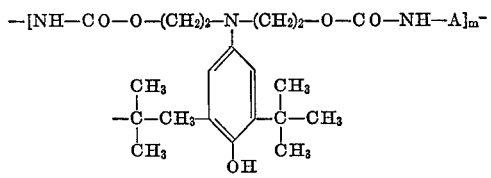

wherein A and *m* have the meaning as given in claim 1.

14. The polyurethane of claim 1, said structural segment having the formula

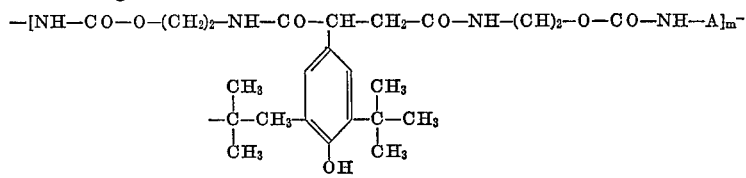

wherein A and *m* have the meaning as given in claim 1.

15. The polyurethane of claim 1, said structural segment having the formula

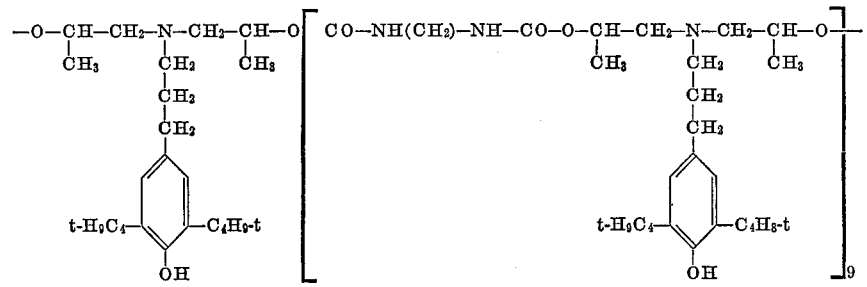

16. A process for the production of polyurethanes stabilized against discoloration and degradation which comprises reacting a polyhydroxy compound, having a molecular weight from about 500 to about 5,000, a organic diisocyanate, a chain lengthening agent and 0.1 to 10% by weight based on the weight of the polyurethan of a phenol of the formula

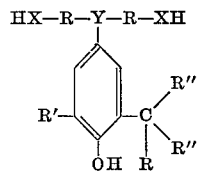

wherein R' is a hydrogen atom, an alkyl group containing 1 to 12 carbon atoms, R is a lower alkyl radical;

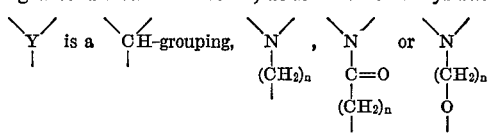

X is oxygen or the NH group;
R is a functional straight chained or branched alkylene radical having one to six carbon atoms, a —CO—NH-group, a —CH$_2$—CO—NH-group, a —CH$_2$—CO—NH—R'''-group or a —CO—NH—R'''-group and R–X may also denote an NH group; R''' is a straight chained or branched alkylene group with one to six carbon atoms, and *n* denotes an integer from 1 to 5 inclusive.

References Cited
UNITED STATES PATENTS

| | | | |
|---|---|---|---|
| 3,351,608 | 11/1967 | Oertel et al. | 260—45.9 |
| 3,395,114 | 7/1968 | Smith | 260—45.95 |
| 3,401,145 | 9/1968 | Rogers et al. | 260—45.95 |

WILLIAM H. SHORT, Primary Examiner

L. L. LEE, Assistant Examiner

U.S. Cl. X.R.

117—161; 260—25, 32.6, 37, 45.9, 45.95, 75, 77.5

PO-1050
(5/69)

UNITED STATES PATENT OFFICE
CERTIFICATE OF CORRECTION

Patent No. 3,536,663      Dated October 27, 1970

Inventor(s) Harald Oertel, et al.

It is certified that error appears in the above-identified patent and that said Letters Patent are hereby corrected as shown below:

| Column | Line | Error |
| --- | --- | --- |
| 1 | 15 | "Stabilizing" should read --- Stabilized --- |
| 3 | 25 | " $\underset{(CH_2)_n}{\mid}$ " should read --- $\overset{\mid}{\underset{\mid}{(CH_2)_n}}$ --- |
| 3 | 31 | "—R"—" should read --- —R'''— --- |
| 3 | 31 | "a CH—" should read --- a CO— --- |
| 4 | 26 | "denote" should read --- denotes --- |
| 4 | 27 | "—H— $\overset{\mid}{\underset{\mid}{C}}$ " should read --- $\overset{H}{\underset{\mid}{-C-}}\overset{\mid}{}$ --- |
| 4 | 27 | "—N— $\overset{\mid}{\underset{\mid}{C}}$ " should read --- $-\overset{\mid}{\underset{\mid}{N}-}\overset{}{\underset{}{C=O}}$ --- |
| 5 | 36 | "(b-hydro-" should read --- (b-hydroxy- --- |
| 5 | 59 | Delete "the", second occurrence |
| 6 | 19 | "-1(6)," should read --- -(1,6), --- |
| 8 | 75 | "g-aminopropylether" should read --- -g-aminopropylether --- |

PO-1050
(5/69)

UNITED STATES PATENT OFFICE
CERTIFICATE OF CORRECTION

Patent No. 3,536,663    Dated October 27, 1970

Inventor(s) Harald Oertel, et al.    PAGE - 2

It is certified that error appears in the above-identified patent and that said Letters Patent are hereby corrected as shown below:

| Column | Line | Error |
|---|---|---|
| 9 | 55 | "hydroxy" should read --- hydroxyl --- |
| 9 | 59 | "genzing" should read --- genizing --- |
| 12 | 32 | "ealstomer" should read --- elastomer --- |
| 12 | 55 | "ot" should read --- to --- |
| 13 | Table 1 | The heading "Filaments built into polyurethane" should read --- Filaments without aftertreatment --- |
| | Example-Exposure | |
| 13 | 1c-44 | Under "1.5% stabilizer. . ., Discoloration" column, "Yellowish" should read --- Yellow --- |
| 13 | 2c-66 | Under "1.5% stabilizer. . ., Discoloration" column, insert "Deep yellow" |
| 14 | Table 2 Example-Exposure 3b-66 | Under "Stabilizer built. . ., TS (break). . ." column, "2.26" should read --- 1.26 --- |
| 14 | See...6b | "Fadeometer exposure. . ." "46" should read --- 66 --- |

UNITED STATES PATENT OFFICE
CERTIFICATE OF CORRECTION

Patent No. 3,536,663     Dated October 27, 1970

Inventor(s) Harald Oertel, et al.     PAGE - 3

It is certified that error appears in the above-identified patent and that said Letters Patent are hereby corrected as shown below:

| Column | Line | Error |
|---|---|---|
| 15 | 47 | "homogenously" should read --- homogeneously --- |
| 15 | 74 | "hydroxy phenylsuccinic" should read --- hydroxy-phenylsuccinic --- |
| 16 | 42 | "-phenyl" should read --- -phenol --- |
| 19 (Cl. 1) | 17 | After " \| " insert --- ; --- <br> (CH$_2$)$_n$ <br> \| <br> O <br> \| |
| 19 | 21 | After "NH-group" delete one --- ; --- |
| 19 | 24 | After "NH-group" insert --- , --- |
| 19 | 25 | "—R"-group" should read --- —R'''-group --- |
| 19 | 34 | After "claim 1" insert --- , --- |
| 21 | 5 | Before "[NH—" insert --- — --- |
| 21 (Cl. 12 Formula) | 11 | " 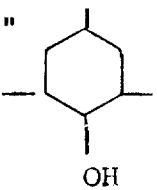 " should read --- 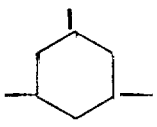 --- |

PO-1050
(5/69)

UNITED STATES PATENT OFFICE
CERTIFICATE OF CORRECTION

Patent No. 3,536,663     Dated October 27, 1970

Inventor(s) Harald Oertel, et al.    PAGE -4

It is certified that error appears in the above-identified patent and that said Letters Patent are hereby corrected as shown below:

| Column | Line | Error |
|---|---|---|
| Cl. 15-Formula | 1 | "[CO-NH(CH$_2$)—NH—" should read --- [CO-NH(CH$_2$)$_6$—NH— --- |
| Cl. 15-Formula | 5 | "—C$_4$H$_8$-t" should read --- —C$_4$H$_9$-t --- |
| 22 | 6 | "polyurethan" should read --- polyurethane --- |
| Cl. 16-Formula | 5 | "$-C{<}^{R''}_{P''}$ with R below" should read --- "$-C{<}^{R''}_{R''}$ with R'' below" --- |

SIGNED AND
SEALED
MAR 2 1971

(SEAL)
Attest:

Edward M. Fletcher, Jr.
Attesting Officer

WILLIAM E. SCHUYLER, JR.
Commissioner of Patents